(12) United States Patent
Brand et al.

(10) Patent No.: US 7,149,673 B1
(45) Date of Patent: Dec. 12, 2006

(54) METHOD FOR ESTIMATING CHANGES IN PRODUCT LIFE FOR A REDESIGNED PRODUCT

(75) Inventors: Michael K. Brand, Renton, WA (US); Harry W. McLean, North Bend, WA (US)

(73) Assignee: Cingular Wireless II, LLC, Atlanta, GA (US)

(*) Notice: Subject to any disclaimer, the term of this patent is extended or adjusted under 35 U.S.C. 154(b) by 0 days.

(21) Appl. No.: 09/557,672

(22) Filed: Apr. 25, 2000

Related U.S. Application Data

(60) Provisional application No. 60/153,007, filed on Sep. 9, 1999.

(51) Int. Cl.
*G06F 17/50* (2006.01)
*G06F 11/00* (2006.01)

(52) U.S. Cl. ............. 703/14; 703/2; 703/6; 714/724; 324/780; 324/760; 73/789

(58) Field of Classification Search ............ 703/2, 703/6, 14, 7; 702/34; 73/789, 804, 814, 73/760; 324/760, 780; 438/466, 770, 15; 714/43, 724; 439/76.1
See application file for complete search history.

(56) References Cited

U.S. PATENT DOCUMENTS

| | | | | |
|---|---|---|---|---|
| 4,866,714 A | * | 9/1989 | Adams et al. | 714/724 |
| 5,030,905 A | * | 7/1991 | Figal | 324/760 |
| 5,210,704 A | * | 5/1993 | Husseiny | 702/34 |
| 5,391,502 A | * | 2/1995 | Wei | 438/466 |
| 5,539,652 A | * | 7/1996 | Tegethoff | 703/14 |
| 5,648,919 A | * | 7/1997 | Yamauchi et al. | 703/6 |
| 5,744,975 A | * | 4/1998 | Notohardjono et al. | 324/760 |
| 5,789,682 A | * | 8/1998 | Dickinson et al. | 73/814 |
| 5,949,682 A | * | 9/1999 | Dickinson et al. | 700/121 |
| 6,301,970 B1 | * | 10/2001 | Biggs et al. | 73/804 |
| 6,491,528 B1 | * | 12/2002 | McLean | 439/76.1 |
| 6,541,394 B1 | * | 4/2003 | Chen et al. | 438/770 |
| 6,546,507 B1 | * | 4/2003 | Coyle et al. | 714/43 |
| 6,571,202 B1 | * | 5/2003 | Loman et al. | 703/2 |
| 6,684,349 B1 | | 1/2004 | Gullo et al. | |
| 6,816,813 B1 | | 11/2004 | Tan et al. | |

OTHER PUBLICATIONS

Chun Kin Chan et al: Sequential Sampling Plans for Early-Life Reliability Assessment, Annual Reliability and Maintainability Symposium, 1997 Proceedings, Philadelphia, PA, Jan. 13-16, 1997, ISSN 0149-144X, pp. 131-135.

Analog Device's Reliability Handbook. pp. 1-23 out of 88 pages. copyright 2000.

Military Standard MIL-STD-690C. Mar. 26, 1993.

Hobbs, Gregg. "What HALT and HASS Can Do For Your Products". copyright 1997, Nelson Publishing.

Wiesling, Paul. "Advance Program $1^{st}$ IEEE/CPMT 2-day Workshop on Accelerated Stress Testing, Sep. 7-8, 1995" Aug. 28, 1995.

(Continued)

*Primary Examiner*—Thai Phan
(74) *Attorney, Agent, or Firm*—Kenyon & Kenyon LLP

(57) ABSTRACT

A method provides early estimation of product life using accelerated stress testing data. In an embodiment, data measured from a product operating in first, high-stress environment is used to predict how long the product will operate in a second, normal operating environment before failure. An additional feature of the present invention provides a quantified indication of how much the product has improved from a redesign.

8 Claims, 5 Drawing Sheets

| | UNIT B | | | | |
|---|---|---|---|---|---|
| | CSS | HSS | RT | Vib | CE |
| HALT 1 FIRST FAILURE (TIME TO FAILURE IN MINUTES) | 73.5 | 83 | 89 | 50 | 11 |
| HALT 2 FIRST FAILURE (TIME TO FAILURE IN MINUTES) | 121.5 | 83 | 13.5 | 110 | 13.5 |
| $\hat{R}_i$ (SEE EQ. 4) | 1.65 | 1.00 | 0.15 | 2.20 | 1.23 |
| $\hat{R}_i^*$ (SEE EQ. 5) | 0.50 | 0.00 | -1.89 | 0.79 | 0.20 |

$\bar{R}^*$ (SEE EQ. 6)    -0.08

$\bar{R}$ (SEE EQ. 7)    0.92    ESTIMATE FOR RELATIVE LIFE R

BOM MTBF    232000
MTBF FOR REDESIGNED UNIT    213440
(SEE EQ. 12)
90% CONFIDENCE LIMITS FOR R
(SEE EQ. 11)
     LOWER LIMIT    0.24
     UPPER LIMIT    3.50

OTHER PUBLICATIONS

Linear Technology, "Reliability Assurance Program", especially p. 11. Undated. www.linear.com/company/quality/RAPweb.pdf. Printed by Examiner on Dec. 27, 2004.

McLean Harry. "A Statistical Approach for the Disposition of HALT Issues." Feb. 15, 2001.

Prakash, Simon. "The Application of HALT and HASS Principles in a High Volume Manufacturing Environment." Qual. Reliab. Engng. Int., vol. 14, pp. 385-392, copyright 1998.

Confer, R. et al. "Use of Highly Accelerated Life Test (HALT) to Determine Reliability of Multilayer Ceramic Capacitors." Proc. 41st Electronic Components and Technology Conf., 1991. pp. 320-.322.

Gera, A. E. "The Modified Exponentiated Weibull Distribution for Life-Time Modeling." Proc. Annual Reliability and Maintainability Synmposium, Jan. 16, 1997. pp. 149-152.

Kim, J.S. "A Test of the Exponential MTBF and Comparison of Power Funtions of the Random Censoring Case." IEEE Transactions on Reliability. Apr. 1988. pp. 103-107.

Mudholkar, G.S. et al. "Exponentiated Weibull Family for Analyzing Bathtub Faiure-Rate Data." IEEE Transactions on Reliability. Jun. 1993. pp. 299-302. (copy not provided by examiner).

Upadhyayula, K. et al. "Guidelines fro Physics-of-Failure Based Accelerated Stress Testing." Proc. Annual Reliability and Maintainable Symposium. Jan. 22, 1998. pp. 345-357. (copy not provided by examiner).

Scalise, J. "Plastic Encapsulated Microcircuits (PEM) Qualification Testing." 46th Electronic Comoponents and Technology Conference, 1996. May 31, 1996. pp. 392-397.

Siegel, B. "Reliability and the Electronic Engineer," Intersil Corporation Application Note AN1104, Mar. 24, 1998. http://www.intersil.com/data/an/an1104.pdf.

Weibull.com, "Arrhenius Relationship Introduction," Printed from the Apr. 23, 2001 archived version stored at Archive.org. http://web.archive.org/web/20010423072851/http://weibull.com/AccelTestWeb/arrhenius_relationship_introduction .htm.

Reliasoft's ALTA 1.0 On-Site Training Guide. © 1999 http://www.reliasoft.org/pubs/alta1_training.pdf.

Shih, C., Lambertson, R., et al., "Characterization and Modeling of a Highly Reliable Metal-to-Metal Antifuse for High-Performance and High-Density Field-Programmable Gate Arrays." 1997 IEEE Int'l Reliability Physics Symposium (IRPS), Apr. 8, 1997.

Technical Program of IRPS '97, pp. 1-2, Apr. 8, 1997 http://www.irps.org/97-35th/tp97.html.

Internet Archive "Way Back Machine" search results for http://www.weibull.com/acceltestwebcontents.htm.

Weibull.com, "Quantitative Accelerated Life Testing Data Analysis: An Overview of Basic Concepts" © 1992-2005 http://www.weibull.com/basics/accelerated.htm.

Weibull.com, "Accelerated Life Testing On_line Reference Contents," Printed from the Jun. 13, 2001 archived version stored at Archive.org. http://web.archive.org/web/20010613024105/http://weibull.com/acceltestwebcontents.htm.

Weibull.com, "The Mean Life Function," Printed from the Apr. 30, 2001 archived version at Archive.org. http://web.archive.org/web/20010430125329/weibull.com/AccelTestWeb/the_mean_life_function.htm.

Weibull.com, "Arrhenius Exponential," Printed from the Apr. 23, 2001 archived version at Archive.org http://web.archive.org/web/20010423072436/weibull.com/AccelTestWeb/arrhenius_exponential.htm.

Weibull.com, "Arrhenius Exponential Statistical Properties Summary," Printed from the Mar. 4, 2001 archived version stored at Archive.org http://web.archive.org/web/20010304055733/weibull.com/AccelTestWeb/arrhenius_exponential_statistical_properties_....htm.

Weibull.com, "Stresses & Stress Levels," Printed from the Apr. 30, 2001 archived version stored at Archive.org. http://web.archive.org/web/20010430192808/weibull.com/AccelTestWeb/stresses_stress_levels.htm.

Weibull.com, "Accelerated Life Testing," Printed from the Mar. 3, 2001 archived version stored at Archive.org. http://web.archive.org/web/20010303041409/weibull.com/AccelTestWeb/acceleratead_life_testing.htm.

Weibull.com, "Types of Accelerated Tests," Printed from the Apr. 22, 2001 archived version stored at Archive.org. http://web.archive.org/web/20010422214528/www.weibull.com/AccelTestWeb/types_of_accelerated_tests.htm.

Weibull.com, "Quantitative Accelerated Life Tests," Printed from the Dec. 17, 2001 archived version stored at Archive.org http://web.archive.org/web/20011217220235/www.weibull.com/AccelTestWeb/accelerated_life_tests.htm.

* cited by examiner

CORRELATION BETWEEN ACCELERATED AND FIELD USE TIME SCALES

| | CSS | HSS | RT | Vib | CE |
|---|---|---|---|---|---|
| HALT 1 FIRST FAILURE (TIME TO FAILURE IN MINUTES) | 120 | 81 | 14 | 53 | 55.5 |
| HALT 2 FIRST FAILURE (TIME TO FAILURE IN MINUTES) | 91.5 | 90.5 | 63 | 83.5 | 87 |
| $\hat{R}_i$ (SEE EQ. 4) | 0.76 | 1.12 | 4.50 | 1.58 | 1.57 |
| $\hat{R}_i^*$ (SEE EQ. 5) | −0.27 | 0.11 | 1.50 | 0.45 | 0.45 |

UNIT A $\bar{R}^*$ (SEE EQ. 6)  0.45

$\bar{R}$ (SEE EQ. 7)  1.57  ESTIMATE FOR RELATIVE LIFE R

BOM MTBF  298462
MTBF FOR REDESIGNED UNIT (SEE EQ. 12)  468585
90% CONFIDENCE LIMITS FOR R (SEE EQ. 11)
  LOWER LIMIT  0.41
  UPPER LIMIT  5.93

| | CSS | HSS | RT | Vib | CE |
|---|---|---|---|---|---|
| HALT 1 FIRST FAILURE (TIME TO FAILURE IN MINUTES) | 73.5 | 83 | 89 | 50 | 11 |
| HALT 2 FIRST FAILURE (TIME TO FAILURE IN MINUTES) | 121.5 | 83 | 13.5 | 110 | 13.5 |
| $\hat{R}_i$ (SEE EQ. 4) | 1.65 | 1.00 | 0.15 | 2.20 | 1.23 |
| $\hat{R}_i^*$ (SEE EQ. 5) | 0.50 | 0.00 | −1.89 | 0.79 | 0.20 |

UNIT B $\bar{R}^*$ (SEE EQ. 6)   −0.08

$\bar{R}$ (SEE EQ. 7)   0.92 ← ESTIMATE FOR RELATIVE LIFE $\bar{R}$

BOM MTBF   232000
MTBF FOR REDESIGNED UNIT (SEE EQ. 12)   213440
90% CONFIDENCE LIMITS FOR R (SEE EQ. 11)
  LOWER LIMIT   0.24
  UPPER LIMIT   3.50

US 7,149,673 B1

METHOD FOR ESTIMATING CHANGES IN PRODUCT LIFE FOR A REDESIGNED PRODUCT

CROSS REFERENCE TO RELATED APPLICATION

The present application claims the benefit of U.S. provisional patent application Ser. No. 60/153,007 entitled "HALTPLUS", filed on Sep. 9, 1999.

BACKGROUND OF THE INVENTION

1. Field of the Invention

The present invention generally relates to reliability engineering. It particularly relates to estimating product failure rates using accelerated stress testing data.

2. Background Art

An important design characteristic of any commercial product (particularly electronic products) is the reliability of the product (system). The military broadly defines reliability as "the probability that an item will perform a required function without failure under stated conditions for a stated period of time." (see MIL-HDBK-721C, "Definition of Terms for Reliability and Maintainability"). Other related references on this subject matter include MIL-HDBK-217, "Reliability Prediction of Electronic Equipment", MIL-HDBK-883, "Test Methods and Procedures for Microelectronics", and Nelson, "Accelerated Testing: Statistical Models, Test Plans, and Data Analyses".

Indeed, the commercial viability of the product may be strongly determined by the product's reliability as potential users will not spend a significant sum of money on an unreliable product. Also, the vital importance of product reliability spurred the emergence of Reliability Engineering as an engineering discipline that devotes itself to establishing, maintaining, and evolving the reliability of a product.

An exemplary useful reliability parameter is the product's failure rate (Failure In Time—FITS, failures per billion device hours) or the inverse measurement of Mean-Time-Between-Failures (MTBF). A failure is commonly defined as any event that prevents the product from performing its specified operations. A product's failure rate is the average rate at which the product will fail over its lifetime (e.g., 2 failures over 50 years). Conversely, the MTBF is total operating time divided by the number of failures over that period (e.g., 25 years/failure or 219,000 hours) which is generally regarded as the length of time a user may reasonably expect the product to work before a failure occurs. Therefore, a primary design objective is to have a very low product failure rate or inversely a very high MTBF. Indeed, most commercial telephone switching equipment is designed for less than two hours of downtime in 40 years, undersea telephone systems are designed for less than three failures in 25 years, and personal computers are designed for a MTBF of at least 1,000,000 hours (assuming end-of-life replacement of component parts).

Therefore, an important reliability engineering procedure is to determine the MTBF for a product. Many reliability engineering methods determine MTBF by observing the product in the field during normal usage and tracking the frequency of failures. However, this method is very costly and time-consuming and does not meet the practical commercial needs of a product manufacturer who wants to accurately predict the MTBF early in the development process which is not possible with currently available methods. Early prediction of MTBF allows the product manufacturer to make any necessary design changes at a low cost to ensure a product deployment with a very low failure rate. Without early prediction of MTBF, a product manufacturer must rely on very time-consuming field use data (requiring months and years of field testing) which delays product deployment and adversely affects future sales. Alternatively, product quality may be reduced if deployment cannot wait for the field use data or the field use data is no longer useful once it is finally obtained thereby increasing the risk of distributing defective products to the market.

To provide early prediction of MTBF, product manufacturers commonly use a procedure standardized by the military described as the "Bill of Materials" (BOM) approach. (Standard MIL 217 and MIL-HNBK-217F Reliability Prediction of Electronic Equipment). The BOM approach theoretically determines the product's MTBF by using the MTBF of each product component. For example, each individual resistor, integrated circuit and other component in a system may have a known MTBF, and the MTBF of the complete product can be calculated using these values. However, the BOM approach is notoriously unreliable because of interactions between product components and other factors which may include, but are not limited to manufacturing process control, end-use environment, and design validation and ruggedness.

Thus, there exists a need to provide an accurate and early estimation of a product's MTBF enabling product manufacturers to deploy relatively defect-free products.

SUMMARY OF THE INVENTION

The present invention overcomes the previously mentioned disadvantages by providing an efficient method for early estimation of MTBF for a product from "accelerated stress testing" data. The accelerated stress testing measures the response of the product operating in a first environment which is used to estimate the MTBF for the product operating in a second environment. In accordance with embodiments of the present invention, the first environment may be one or more test environments more likely to cause the product to fail than the second environment which is the normal operating environment for the product. The method disclosed herein advantageously may provide an efficient and early estimation of MTBF enabling necessary design changes and reduction of development costs. An additional feature of the present invention provides an efficient technique for determining the life impact of a product redesign wherein the accelerated stress testing data may include data from a plurality of test environments.

DETAILED DESCRIPTION

Overview

Figure 1:
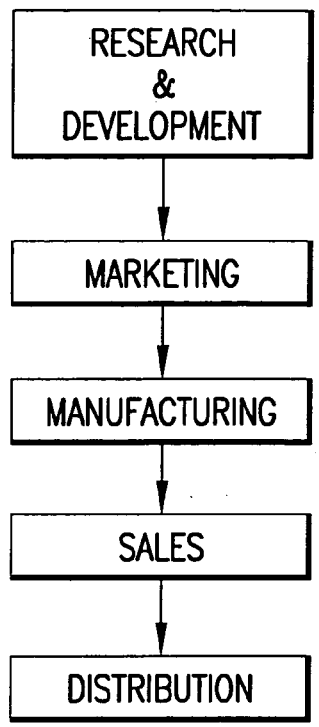
FIG. 1 is a block diagram showing an illustrative product development cycle.

FIG. 1 provides an illustrative example of a typical product cycle to which the present invention may be advantageously applied. It is noted that the product cycle shown is exemplary and numerous variations thereof may exist dependent on several factors, an example being product management procedures. The present invention is applicable such variations as well. Thus, it is to be understood that the described product cycle is provided for explanatory purposes only and does not serve as a limitation on the scope of the present invention.

Typically, a product may be initially conceived and developed during the research and development stage. Following a successful proof of concept or feasibility study, the product enters the marketing stage where it is commonly marketed to potential customers and/or subject to detailed market research assessments. After favorable marketability studies are performed, the product may be manufactured and then sold and distributed to customers in the manufacturing and sales phases. Commonly, reliability testing performed during the manufacturing phase uncovers product defects which must be corrected. This can result in costly delays to deployment. In embodiments described herein, the invention may be advantageously applied prior to the manufacturing stage (e.g., the research and development stage) to discover latent product defects thereby enabling efficient and low-cost modification of the product if necessary.

In accordance with embodiments of the present invention, the method described herein uses accelerated stress testing data to predict a Mean-Time-Between-Failures (MTBF) for a product. An exemplary type of accelerated stress testing that may be used is Highly Accelerated Life Testing (HALT). HALT is commonly used in conjunction with Highly Accelerated Stress Screen (HASS), a program used during manufacturing testing to uncover latent product defects and establish product quality control. HALT typically comprises a number of different stress regimens (conditions) designed to produce failures resulting from product usage in extreme operating environments. HALT advantageously provides a measure of the response of the product when subjected to the extreme operating conditions. The measured response may advantageously include the measured characteristics of the product wherein these characteristics may include, but are not limited to gain, operating time, bandwidth, frequency, or other product characteristics.

Generally stated, the purpose of accelerated stress testing is to break the product so it can then be redesigned and improved. These different stress regiments (tests) can include, but are not limited to multiple axis vibrational tests, rapid temperature transitions, high/low temperature limits, voltage margining, frequency margining, electrostatic discharge test (ESD), humidity tests, and any other test designed to find weak links in the product design. Commonly, HALT testing is carried out in environmental test chambers as part of the effort to uncover product weaknesses and then improve the product. These and other features of HALT and HASS are known to those skilled in the art and therefore not described in great detail.

In an embodiment, an additional feature of the invention provides a method for estimating the amount of change in product life resulting from the redesign of a product. The redesign, for example, may have been spurred by accelerated stress testing data (e.g., HALT). This change in product life is referred to as Relative Life (R). It is to be understood that these and other terms used herein are solely used for purposes of clarity and should not be construed as any limitation upon the present invention.

The amount of change in product life can be described either in relative terms or, if an initial estimate of product MTBF exists, in terms of MTBF improvement. The change in product life, R, is relative to some unknown initial product life. This relative change represents a proportion (factor) increase or decrease in product life due to implemented design changes. The method described herein can also be used to estimate the absolute change in MTBF if an initial MTBF estimate is available. An initial MTBF is that which is characteristic of the product prior to implementation of any design changes. Relative Life multiplied by an initial MTBF estimate will yield a new MTBF estimate reflecting the results of design changes implemented during HALT.

Advantageously, the initial MTBF may be derived using BOM $\lambda$ values, wherein $\lambda$ represents the failure rate for different product components, in conjunction with compatible reliability software wherein the $\lambda$ factors in the reliability software database are adjusted from their default values so that they reflect realistic levels of actual field failure rate for the product components. For example, if the database shows $\lambda=70$ FITS for a crystal oscillator (an exemplary product component), but recent field results indicate that the actual FIT rate has improved by 50%, then the $\lambda$ for the oscillator should be adjusted accordingly (e.g., lowered to $\lambda=35$ FITS).

The method described herein is predicated on the idea that accelerated stress testing relates to field use conditions and that there is a mathematical relationship between the accelerated stress test and field use. Specifically, it is assumed that this relationship adequately maps from the accelerated stress test time line to the field use time line. In an embodiment, the accelerated stress testing data results from linear acceleration.

In accordance with an embodiment, the type of HALT process to which this method can be advantageously applied involves two separate HALTs (HALT 1, HALT 2). The first HALT is performed on the original unit (or a previous design of the current product) and the second HALT is performed on the redesigned unit that incorporates all necessary design changes indicated by the first HALT. Advantageously, HALT 1 and HALT 2 provide the same stress tests at the same stress levels, as applied to the original unit and the redesigned unit, but variations in the stress testing and stress levels can be factored into the MTBF estimation as described herein. Using this method of HALT, each stress regimen (test) is terminated once the operational limit is found. Furthermore, the derivation of this method assumes that the conditions (i.e., stress limits, chamber type, test suites, equipment, etc.) under which the second HALT is conducted are the same as the conditions of the first HALT. This assumption of similarity between HALT 1 and HALT 2 conditions is necessary to provide a valid comparison of the results for HALT 1 and HALT 2 that will yield an unbiased statistical estimate for relative life.

However, in practical applications of HALT, it often happens that some stress limits in HALT 2 are more extreme than the stress limits in HALT 1. For example, it may happen that the stress limits in Rapid Thermal Cycling (performed as part of HALT) are more extreme in HALT 2 due to the improved design. If this situation occurs, the application of this method may yield an underestimate of the true relative life. In other words, this method may yield a biased statistical estimate that is too small. Thus, if HALT 2 is run with limits more extreme than HALT 1 then the estimate obtained from the invention method should be interpreted as something less than the true amount of improvement in relative life. Lacking further information, the magnitude of the bias (i.e., the difference between the expected value of the estimate and the true value) is not known. Further details regarding this issue are described herein.

Description of Terms

Following is a description of the terms that will be used throughout the specification:

DESCRIPTION OF TERMS
Following is a description of the terms that will be used throughout the specification:

| | |
|---|---|
| R | Relative Life representing the proportion change in product life resulting from design changes. R is the parameter of interest (i.e., the true but unknown value). |
| $\bar{R}$ | The statistic used to estimate R. |
| R* | The natural log of R. |
| $\bar{R}$* | The statistic used to estimate R*. |
| $\hat{R}_i$ | Estimated change in product life for the $i^{th}$ stress regimen. |
| $\hat{R}_i$* | The natural logarithm of $\hat{R}_i$. |
| $MTBF_{F2}$ | Mean Time Between Failure on field use time scale for redesigned unit. |
| $MTBF_{F1}$ | Mean Time Between Failure on field use time scale for original unit. |
| $MTBF_{A2}$ | Mean Time Between Failure on accelerated time scale for redesigned unit. |
| $MTBF_{A1}$ | Mean Time Between Failure on accelerated time scale for original unit. |
| $t_F$ | Failure time on field use time scale. |
| $t_A$ | Failure time on accelerated time scale. |
| $t_{A2i}$ | Failure time on the accelerated time scale for the $i^{th}$ stress regimen for the redesigned unit. |
| $t_{A1i}$ | Failure time on the accelerated time scale for the $i^{th}$ stress regimen for the original unit. |
| AF | Acceleration Factor. |
| $\sigma_{\hat{R}_i}$* | The standard deviation of $\hat{R}_i$*. |
| $\sigma_{\bar{R}}$* | The standard error of $\bar{R}$*. |

Linear Acceleration

Figure 2:
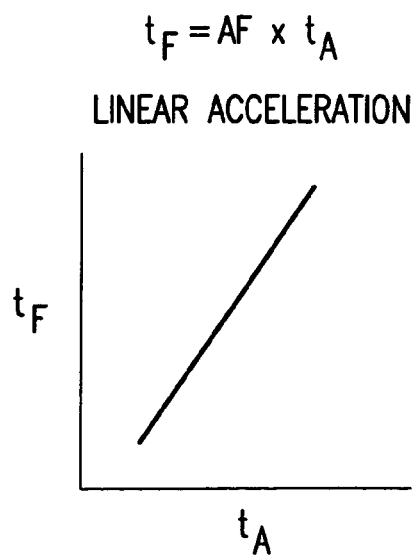
FIG. 2 is a diagram showing linear acceleration factor in accordance with an embodiment of the present invention.
Figure 3:
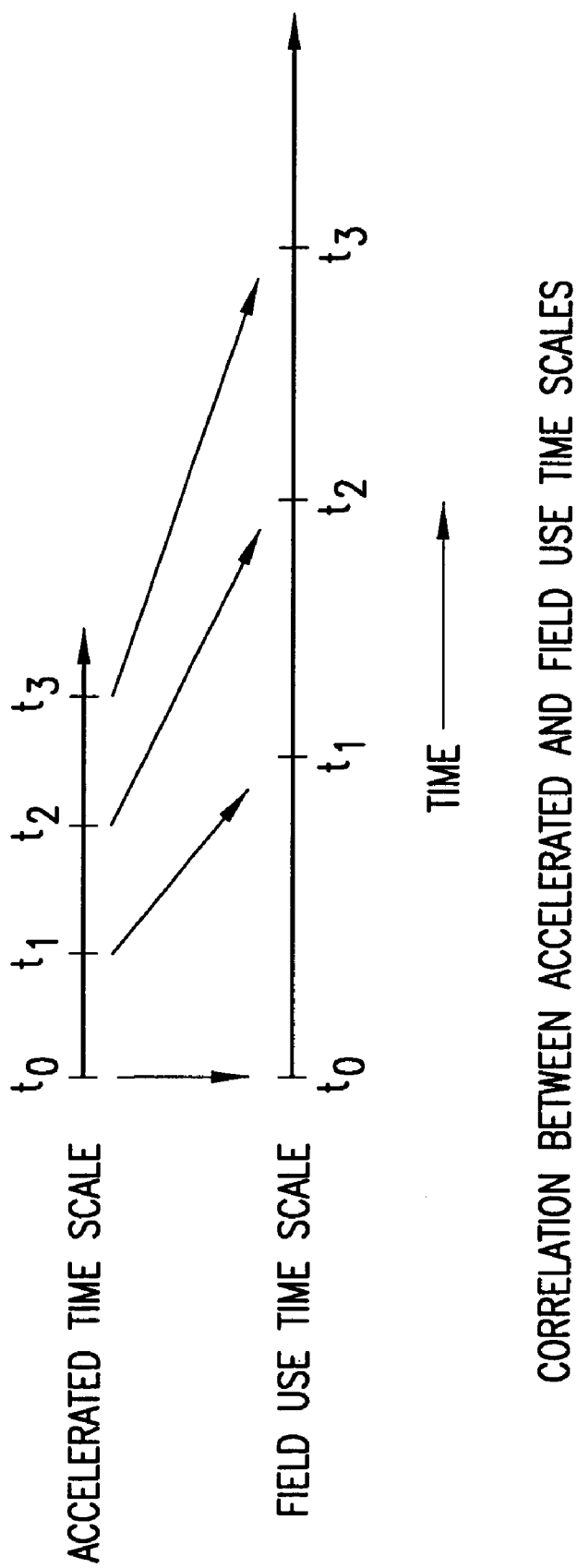
FIG. 3 is a diagram showing relationship between accelerated and field use times in accordance with an embodiment of the present invention.

Linear Acceleration, commonly used in single test condition cases, is described by the equation $t_F = AF \times t_A$. In this equation, $t_F$ is time on the field use time scale and $t_A$ is time on the accelerated time scale (see FIGS. 2, 3). AF is the Acceleration Factor appropriate for the particular stress regimen being used. AF is the time-lengthening factor used to determine field use time-to-failure from a time-to-failure measured under accelerated stress testing conditions. For example, if the product being tested (e.g., an engine) ran 600 hours to failure under accelerated stress testing and has an AF of 3, then it is assumed that the engine will operate 600×3=1800 hours to failure under field operating conditions. It is noted that these acceleration factors need not be known in order to apply the method described herein. As will be shown in the following derivation, these acceleration factors cancel out of all equations when calculating relative life.

In applying the method described herein, it is assumed that an unmodified unit design (or previous design) can be represented by a population distribution for time to failure on the accelerated time scale. Furthermore, a unit with implemented design changes can be represented by a potentially different population distribution on the accelerated time scale. The difference between these two distributions will represent the amount of change resulting from the implemented design changes. More specifically, the ratio of the observed failure times from each distribution can be used to estimate relative change in product life (i.e., Relative Life).

Calculating Relative Life for a Single Stress Regimen

Relative Life (denoted by R) represents the factor (proportion) change in product life resulting from a design change or a group of design changes. As described herein for an embodiment, the parameter to be estimated is R. R is defined as the ratio of the field use MTBF of the redesigned unit to the field use MTBF of the original unit (or a previous design). The parameter R is given by equation 1.

$$R = MTBF_{F2}/MTBF_{F1} \qquad \text{eq. 1}$$

$MTBF_{F2}$ is the field use mean for the redesigned unit studied in HALT 2 and $MTBF_{F1}$ is the field use mean for the previous design studied in HALT 1. The statistic that will be used to estimate this parameter is defined as the ratio of time to first failure of the modified design to time to first failure of the previous design. By convention, the time to first failure for HALT 2 will always be placed in the numerator and the time to first failure for HALT 1 will be placed in the denominator. Thus, a relative life value greater than 1 will indicate an improvement in product life. A relative life value of less than 1 will indicate a degradation in product life and a relative life equal to 1 will indicate no change in product life. It is noted that the calculated statistics for relative life are only estimates of the true change in product life and are subject to variability. The method described herein also includes a determination of confidence limits for R.

For a specific stress regimen, let $t_{A1}$, represent the time to first failure during the stress test for the original (unmodified) unit. This value can be advantageously determined during the HALT 1 testing procedures. In this notation, the subscript A stands for Accelerated and the number 1 indicates the original (previous design) unit (i.e., HALT 1). HALT 1 advantageously represents the accelerated stress testing performed on the original unit (previous design). Let $t_{A2}$ represent the time to first failure during the stress test (i.e., HALT 2) for the modified (redesigned) unit. This value may be determined during HALT 2 as HALT 2 advantageously represents the accelerated stress testing performed on the modified (redesigned) unit. Similarly, $t_{F1}$, and $t_{F2}$ represent the times to first failures (hypothetical) under field use conditions for the unmodified and modified units, respectively.

Estimated Relative Life (denoted by $\hat{R}$) for a single stress regimen can be calculated from HALT data using the following equation:

$$\hat{R} = \frac{t_{A2}}{t_{A1}} \qquad \text{eq. 2}$$

Using $t_{F2}/t_{F1}$, as an estimate for R as given in equation 1, equation 2 is derived from the simple relationship shown in equation 3.

$$\hat{R} = \frac{t_{F2}}{t_{F1}} = \frac{AF \times t_{A2}}{AF \times t_{A1}} = \frac{t_{A2}}{t_{A1}} \qquad \text{eq. 3}$$

Relative Life for a given stress regimen as calculated from the above equation represents an estimate for the relative amount of change in product life resulting from the group of design changes implemented as a result of the first HALT. A separate Relative Life value can be calculated for each stress regimen (test) in HALT wherein each regimen advantageously includes a different type of stress or stimuli being applied to the unit under test. An exemplary application of HALT includes five stress regimens (tests), examples being cold step stress (CSS), hot step stress (HSS), rapid thermal cycling (RT), step vibration (VIB), and combined environments (CE). Thus, if there are five stress regimens being used in the HALT, there will be five separate values for $\hat{R}$.

Exemplary CSS testing comprises the product beginning operation at a starting temperature (e.g., 20° C.) wherein the temperature is then decreased in successive steps (e.g., 10° C. steps) until the failure occurs. Similarly, exemplary HSS testing comprises the product beginning operation at a starting temperature wherein the temperature is then increased in successive steps until the failure occurs. Exemplary RT testing comprises applying continuous temperature increases and decreases to the product until failure occurs. Exemplary VIB testing comprises attaching the product to a vibration table wherein the product is subject to vibration in the X, Y, Z and rotational axes. Exemplary CE testing applies a pre-determined combination of accelerated stress tests (e.g., RT, VIB, etc.) to the product. It is noted there exist several variations of the type of accelerated testing used and testing procedures described herein, and so while an exhaustive list is not included herein, it is to be understood that any such embodiments using a variation thereof are contemplated here and are within the scope of the present invention.

Calculating Relative Life Across all Stress Regimens

For calculating relative life, let $\hat{R}_i$ represent the estimated relative life from the $i^{th}$ stress regimen. A composite value for Relative Life (call it $\overline{R}$) can be obtained by combining the individual values for $\hat{R}_i$ from each stress regimen. $\overline{R}$ will be the estimate for R (the true but unknown relative life). Assuming that the time to failure values for each unit (modified and unmodified units) are exponentially distributed, $\overline{R}$ can be calculated as shown below. In the following notation, k is the number of stress regimens in the HALT.

$$\hat{R}i = \frac{t_{A2i}}{t_{A1i}}$$ eq. 4

Let $\hat{R}_i^* = \ln(\hat{R}_i)$ eq. 5

$$\overline{R}^* = \frac{1}{k}\sum_{i=1}^{k} \hat{R}_i^* = \frac{1}{k}\sum_{i=1}^{k} \ln(\hat{R}_i)$$ eq. 6

$$\overline{R} = \text{EXP}[\overline{R}^*] = \text{EXP}\left[\frac{1}{k}\sum_{i=1}^{k} \ln(\hat{R}_i)\right]$$ eq. 7

As mentioned previously, $\overline{R}$ is a point estimate for R.

Calculating a Confidence Interval for R

A confidence interval for R can be calculated using the following results, the derivation of which is described herein. The standard deviation of $\hat{R}_i^*$ is given by, $$\sigma_{\hat{R}_i^*} = 1.81$$ eq. 8

It follows that the standard error of $\overline{R}^*$ based on k stress regimens is, $$\sigma_{\overline{R}^*} = \frac{\sigma_{\hat{R}_i^*}}{\sqrt{k}}$$ eq. 9

It can be shown that the distribution of $\overline{R}^*$ is approximately normal. Let $z_{\alpha/2}$ represent the standard normal deviate having $\alpha/2$ of the area in the tail of the distribution. A $(1-\alpha)*100\%$ confidence interval for R* is given by, $$\overline{R}^* \pm z_{\alpha/2} \times \sigma_{\overline{R}^*}$$ eq. 10

For example, a 90% confidence interval for R* based on k=5 stress regimens is given by, $$\overline{R}^* \pm (1.645 \times 0.81)$$

⇓

$$\overline{R}^* \pm 1.33$$

This confidence interval for R* can be converted to a confidence interval for R by simply taking the antilog of the limits shown above. Thus, a 90% confidence interval for R is given by, $$\text{EXP}(\overline{R}^* - 1.33) \text{ to } \text{EXP}(\overline{R}^* + 1.33)$$ eq. 11

Derivation of Results

The following relates the derivation of the results used in the method described above. This derivation assumes two independent random variables (X & Y) each of which have an Exponential Distribution with parameter $\lambda$. In order to simplify the notation, Y is being used in place of $t_{A2}$ and X is being used in place of $t_{A1}$.

The Exponential Density Function is given by, $$f(x) = \lambda \cdot e^{-\lambda \cdot x}$$

The Gamma Density Function defined for x>0 is given by, $$\Gamma(x, \alpha, \lambda) = \frac{\lambda^\alpha \cdot x^{\alpha-1} \cdot e^{-\lambda x}}{\Gamma(\alpha)}$$

where, $\Gamma(\alpha)$ is the Gamma Function given by, $$\Gamma(\alpha) = \int_0^\infty x^{\alpha-1} \cdot e^{-x} dx$$

For the special case where $\alpha=1$, the Gamma Density Function reduces to the Exponential Density Function with parameter $\lambda$. Thus, for $\alpha=1$, $$\Gamma(x, 1, \lambda) = \text{Exponential}(\lambda)$$

It can be shown through the method of convolution that the density function of the ratio of two independent random variables (X & Y) each having a Gamma Density with parameters $\alpha_1, \lambda$ and $\alpha_2, \lambda$ respectively, is given by the following density function. Let z be a random variable where Z=Y/X. The density function for z is (where 0<z<infinity), $$f(Z) = \frac{\Gamma(\alpha_1 + \alpha_2) \cdot z^{\alpha_2 - 1}}{\Gamma(\alpha_1) \cdot \Gamma(\alpha_2) \cdot (z+1)^{\alpha_1 + \alpha_2}}$$

where f(Z) is a Beta Density Function.

In the special case where Y and X are exponentially distributed both $\alpha_1=1$ and $\alpha_2=1$. In this case the density function for the ratio reduces to, $$f(z) = \frac{1}{(z+1)^2}$$

From this, it follows that the distribution function for z is, $$F(z) = \int_0^\infty f(z)dz$$
$$= \int_0^\infty \frac{1}{(z+1)^2}dz$$
$$= -\frac{1}{(1+z)}$$

Let $W=\ln(Z)$. Using the method of "change of variable", the distribution of W is derived as follows:

$$G(w) = P(W \le w)$$
$$= P(\ln(Z) \le w)$$
$$= P(Z \le e^w) = F(e^w)$$

Therefore, $$G(w) = F(e^w) = 1 - (1+e^w)^{-1}$$

Given the distribution function G(w), the density function for w can be determined as follows:

$$g(w) = \frac{d}{dw}G(w) = (1+e^w)^{-2} \cdot e^w = \frac{e^w}{(1+e^w)^2}$$

The density function for W can now be used to describe the mean and variance for W. Let the mean for W be denoted by E(w) and the variance for W be denoted by VAR(w).

$$E(w) = \int w \cdot g(w)dw$$

$$\int w \cdot \frac{e^w}{(1+e^w)^2}dw \to -\ln(1+\exp(w)) + \ln(\exp(w)) \cdot \frac{\exp(w)}{(1+\exp(w))}$$

Evaluating this expression from minus infinity to plus infinity gives the expected value for W.

$$E(w) = \int_{-\infty}^\infty w \cdot g(w)dw = \int_{-\infty}^\infty w \cdot \frac{e^w}{(1+e^w)^2}dw = 0$$

Taking the antilog of this result gives an expected value of 1. This is what is expected in the special case where both distributions have the same MTBF (i.e., the same λ).

Similarly, the variance for W is given as follows:

$$VAR(w) = \int w^2 \cdot \frac{e^w}{(1+e^w)^2}dw \to VAR(w) = \frac{-w^2}{(1+\exp(w))} -$$
$$2 \cdot dilog(1+\exp(w)) - 2 \cdot \ln(\exp(w)) \cdot \ln(1+\exp(w)) + \ln(\exp(w))^2$$

Where, $$dilog(x) = \int_1^x \frac{\ln(t)}{1-t}dt$$

Evaluating VAR(w) gives the following, $$VAR(w) = \int_{-\infty}^\infty (w - E(w))^2 g(w)dw = \int_{-\infty}^\infty w^2 \cdot \frac{e^w}{(1+e^w)^2}dw = \frac{1}{3}\pi^2$$

Thus, the variance of W is 3.289. Therefore, the standard deviation of W is 1.81 as stated in equation 8 in the section on calculating a confidence interval for R. This result for the variance of W has been shown for the special case where λ is the same for both Y and X. It can be shown that the same result holds when λ is not the same for Y and X.

Calculating MTBF for the Redesigned Unit

An MTBF estimate for the redesigned unit can be calculated if an initial MTBF estimate for the unmodified unit is available. An initial MTBF for the unmodified unit can often be obtained via a parts count method (e.g., Bill of Materials—BOM). MTBF for the redesigned unit can be calculated as follows:

$$MTBF_{Redesign} = \overline{R} \times MTBF_{initial} \qquad \text{eq. 12}$$

Confidence limits for MTBF can be calculated by substituting the previously calculated limits for R into the above equation.

Estimation of Product Life

Figure 4:
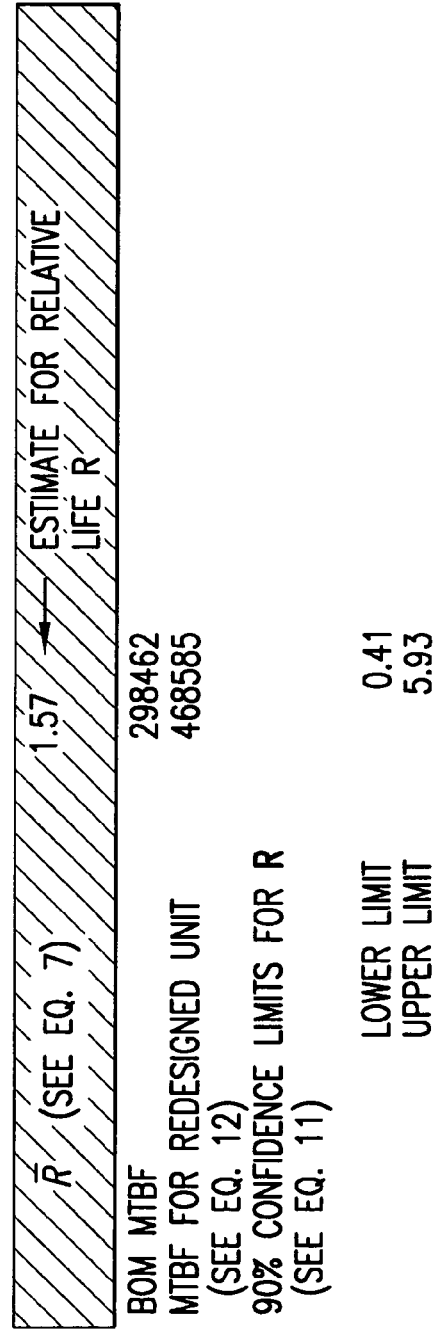
FIG. 4 is a table showing MTBF estimation in accordance with an embodiment of the present invention.
Figure 5:
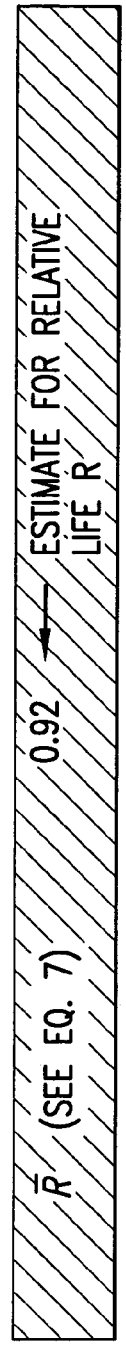
FIG. 5 is a table showing MTBF estimation in accordance with an embodiment of the present invention.
Figure 6:
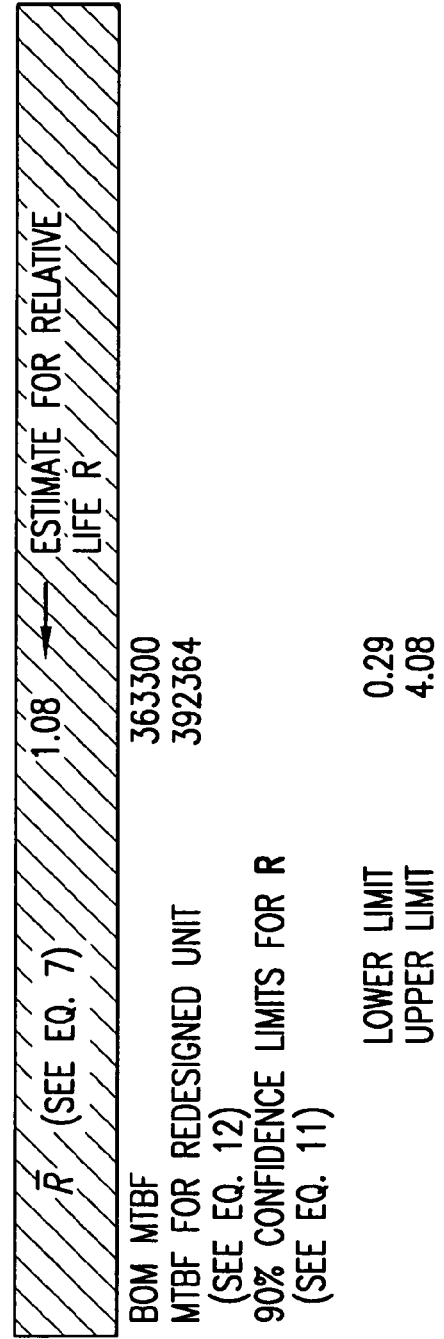
FIG. 6 is a table showing MTBF estimation in accordance with an embodiment of the present invention.

Application of the method described herein to actual HALT results for three products (Unit A, Unit B, Unit C) is shown in FIGS. 4–6. As shown in the figures, five exemplary HALT stress regimens that were used include CSS, HSS, RT (Rapid Thermal), Vib (Vibration Step Stress), and CE (Rapid Thermal combined with Vibration Step Stress). Actual results are shown for three different units and all failure times are measured in minutes. The BOM MTBF is used as the MTBF for the original product (previous design).

For Unit A (see FIG. 4), the estimate for relative life indicates that the unit life has improved by a factor of 1.57. Generally, it may be estimated that the redesigned unit is 57% better than the original unit in terms of product life. It is recognized that 1.57 is only an estimate for R and that the true value for the amount of change is most likely different from this estimate. The 90% confidence limits give upper and lower bounds on where the true value for R probably lies. In this example, there is a 90% probability that the true value for R is larger than 0.41 and smaller than 5.93. Since values less than 1 are contained inside this interval, it is not possible to conclusively state that the product life has improved.

During the course of accelerated stress testing, it is assumed that only four physical units are being evaluated during HALT which gives rise to the uncertainty. Generally, the failure rate of a product is a function of the product's operating environment. As the operating environment becomes harsher, the product's failure rate will increase. Therefore, commonly a product's field failure rate is low ($\le$1%) when operating in a low-stress environment (e.g., office environment at room temperature) which consequently makes the probability of finding a failure low as well. HALT testing improves the probability of finding a failure without requiring a substantial number of test units. Assuming four units being tested, the theoretical probability of finding a failure during testing is 25% (one in four units). With experience from previous HALTs and the assumptions described herein, it is determined that this theoretical probability is actually higher in practice as the physical sample size of four units actually behaves as substantially more than four units when subjected to HALT testing, HALT being an exemplary accelerated stress testing method. For example, if a failure mode has a field failure rate of 1%, then the probability of finding at least one failure in a sample of n=4 units is 4%. A failure mode refers to the specific type of failure uncovered (e.g., solder joint, bad component, etc). If application of HALT testing increases the product failure rate (e.g., failures occur more frequently) by a factor of 10, then the HALT failure rate will be 10% (10×1%) and the probability is 34% of finding at least one failure in HALT using a sample of n=4 units wherein the determination of the increased probability may be based on probability theory known in the art. At the field failure rate of 1% it would take a sample size of 42 units to give a probability of 34% of detecting at least 1 failure. This assumption of the increase in sample size has been generally referred to as the "Virtual Sample Size".

Applying the factor 1.57 to the initial MTBF gives an MTBF for the redesigned unit of 468585 hours. Once again, this must be viewed as an estimate. The confidence limits for R could be applied to the initial MTBF estimate to give approximate confidence limits for the true MTBF for the redesigned unit.

It is noted that method described herein may be advantageously embodied in a software computer program compatible with any computer operating system. In an exemplary embodiment, the accelerated stress testing data may be used by the program (inputted either manually or automatically) to calculate the MTBF (including R) for the product.

Effect of Dissimilar Stress Limits

It has been asserted that if the stress limits for HALT 2 are more extreme than the stress limits for HALT 1 then the estimate for relative life underestimates the true value for relative life. The following is a proof of this assertion and is predicated on the assumption that more extreme stress limits on a given stress regimen imply a greater acceleration factor. Let $AF_2$ represent the acceleration factor for a given stress regimen under HALT 2 and let $AF_1$ represent the acceleration factor for the same stress regimen under HALT 1. Under the situation where HALT 2 has more extreme stress limits than HALT 1, $AF_2$ is greater than $AF_1$.

Recall that the ratio $t_{A2}/t_{A1}$ for a given stress regimen is the statistic used to estimate $$\frac{MTBF_{A2}}{MTBF_{A1}}$$

It follows, as shown below, that this statistic will underestimate R as given by equation 1.

$$\text{Assume } AF_2 > AF_1 \text{ Then} \frac{AF_2}{AF_1} > 1$$

$$R = \frac{MTBF_{F2}}{MTBF_{F1}} = \frac{AF_2 \times MTBF_{A2}}{AF_1 \times MTBF_{A1}}$$

-continued $$\frac{MTBF_{F2} \times MTBF_{A1}}{MTBF_{F1} \times MRBF_{A2}} = \frac{AF_2}{AF_1} > 1$$

$$\frac{MTBF_{F2}}{MTBF_{F1}} > \frac{MTBF_{A2}}{MTBF_{A1}}$$

$$\therefore R > \frac{MTBF_{A2}}{MTBF_{A1}}$$

Since $MTBF_{A2}/MTBF_{A1}$ is less than the true amount of product life change, the statistic used to estimate $MTBF_{A2}/MTBF_{A1}$ will consistently underestimate the true amount of change.

Although the invention is described herein using primarily HALT stress tests, it will be appreciated by those skilled in the art that modifications and changes may be made without departing from the spirit and scope of the present invention. As such, the method and apparatus described herein may be equally applied to any accelerated stress testing designed to expose product defects early in the product development process.

What is claimed is:

1. A method of estimating a product life, comprising:
    performing accelerated stress testing on a product to collect accelerated stress testing data for the product;
    based on the accelerated stress testing data, calculating a mean-time-between-failures for the product;
    re-designing the product;
    performing accelerated stress testing on the re-designed product to collect redesign accelerated stress testing data for the re-designed product;
    based on the re-design accelerated stress testing data, calculating a mean-time-between-failures for the re-designed product; and
    based on the mean-time-between-failures for the product and the mean-time-between-failures for the re-designed product, calculating a proportion change in product life resulting from the re-design.

2. The method of claim 1, wherein:
    the accelerated stress testing data represents the length of time the product operates in a testing environment before the product fails.

3. The method of claim 1, wherein:
    the accelerated stress testing data is derived from a plurality of different stress tests.

4. The method of claim 1, wherein:
    said accelerated stress testing data is derived from either linear, quadratic or exponential acceleration stress testing.

5. The method of claim 1, further comprising:
    calculating upper and lower confidence limits for the MTBF (mean-time-before-failures) calculation.

6. The method of claim 1, wherein:
    said accelerated stress testing data includes bill of materials (BOM) information on the product.

7. The method of claim 1, wherein:
    said calculating steps are performed using a computer program.

8. The method of claim 1, wherein the accelerated stress testing includes at least one of a vibrational test, a temperature test, a voltage margining test, a frequency margining test, an electrostatic discharge test, and a humidity test.

* * * * *